(12) United States Patent
Oscherov et al.

(10) Patent No.: US 8,082,334 B1
(45) Date of Patent: Dec. 20, 2011

(54) PROVIDING DIRECT ACCESS TO MANAGED CONTENT

(75) Inventors: Alex Oscherov, Danville, CA (US); Victor Spivak, San Mateo, CA (US); Eric Lundblad, Oakland, CA (US); Alex Treyger, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 908 days.

(21) Appl. No.: 11/229,318

(22) Filed: Sep. 15, 2005

(51) Int. Cl.
*G06F 15/173* (2006.01)
*G06F 15/16* (2006.01)

(52) U.S. Cl. ......... 709/223; 709/217; 709/219; 709/226

(58) Field of Classification Search .................. None
See application file for complete search history.

(56) References Cited

U.S. PATENT DOCUMENTS

| | | | |
|---|---|---|---|
| 6,389,422 B1 * | 5/2002 | Doi et al. ...................... 707/784 |
| 6,757,712 B1 | 6/2004 | Bastian et al. |
| 6,804,674 B2 | 10/2004 | Hsiao et al. |
| 6,832,253 B1 | 12/2004 | Auerbach |
| 6,879,998 B1 | 4/2005 | Raciborski et al. |
| 7,284,017 B2 | 10/2007 | Baune |
| 7,340,571 B2 | 3/2008 | Saze |
| 7,558,837 B1 | 7/2009 | Denny |
| 2002/0198937 A1 | 12/2002 | Diwan et al. |
| 2003/0050979 A1 | 3/2003 | Takahashi |
| 2003/0065739 A1 | 4/2003 | Shnier |
| 2003/0187956 A1 * | 10/2003 | Belt et al. ...................... 709/219 |
| 2004/0111398 A1 | 6/2004 | England et al. |
| 2004/0148344 A1 | 7/2004 | Navar et al. |
| 2004/0216084 A1 | 10/2004 | Brown et al. |
| 2005/0010653 A1 | 1/2005 | McCanne |
| 2005/0044260 A1 | 2/2005 | Abramson et al. |
| 2005/0120050 A1 | 6/2005 | Myka et al. |
| 2005/0149575 A1 | 7/2005 | Baune |
| 2005/0160154 A1 | 7/2005 | Raciborski et al. |
| 2005/0216524 A1 | 9/2005 | Gomes et al. |
| 2005/0235282 A1 | 10/2005 | Anderson |
| 2005/0246393 A1 | 11/2005 | Coates et al. |
| 2006/0041614 A1 * | 2/2006 | Oe ...................... 709/203 |
| 2006/0053250 A1 | 3/2006 | Saze |
| 2006/0080546 A1 * | 4/2006 | Brannon et al. ............. 713/185 |
| 2006/0294223 A1 | 12/2006 | Glasgow et al. |
| 2008/0177803 A1 | 7/2008 | Fineberg et al. |

OTHER PUBLICATIONS

U.S. Appl. No. 11/229,036, Oscherov et al.
U.S. Appl. No. 11/229,317, Oscherov et al.
U.S. Appl. No. 11/823,608, Randall et al.

* cited by examiner

*Primary Examiner* — Karen Tang
*Assistant Examiner* — Cheikh Ndiaye
(74) *Attorney, Agent, or Firm* — Van Pelt, Yi & James LLP

(57) ABSTRACT

A method for providing direct access to managed content is disclosed. The method comprises receiving a request to perform an operation with respect to content associated with a set of managed content and obtaining information required to respond to the request. The method further comprises providing in response to the request a content locator usable to perform the requested operation through direct communication with a content system.

27 Claims, 10 Drawing Sheets

PROVIDING DIRECT ACCESS TO MANAGED CONTENT

BACKGROUND OF THE INVENTION

Content management systems provide the capability of managing content including typically the ability to search a body of stored content for and retrieve particular content of interest. Additional functionality provided by a content management system may include, without limitation, tracking revisions, versions, review, approvals, distribution, life cycle and retention policy information, file name, file type, file creator, application used to create, owner, and any other data and/or metadata associated with stored content. In a typical content management system, a request from a user to retrieve content, such as a particular file, version, or other stored object, results in the content management system obtaining the requested content from a content storage location, e.g., a content server, and providing the requested content to the user. Because the content management system has limited throughput, this middleman role limits the performance of data delivery to and from the content server or other storage location. It would be beneficial to be able to utilize the advantages of a content management system without suffering the performance limitations the content management system can impose.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing direct access to managed content is disclosed. A remote system sends to a content management system a request associated with particular content, such as a request to retrieve and/or store (write) particular content. Information required to respond to the request is obtained from a content system. A content locator, based at least in part on the information obtained from the content system, is provided to the remote system. The content locator enables the remote system to retrieve the requested content directly from the content system or directly write to the content system, as applicable, without the content first passing through the content management system.

Figure 1:
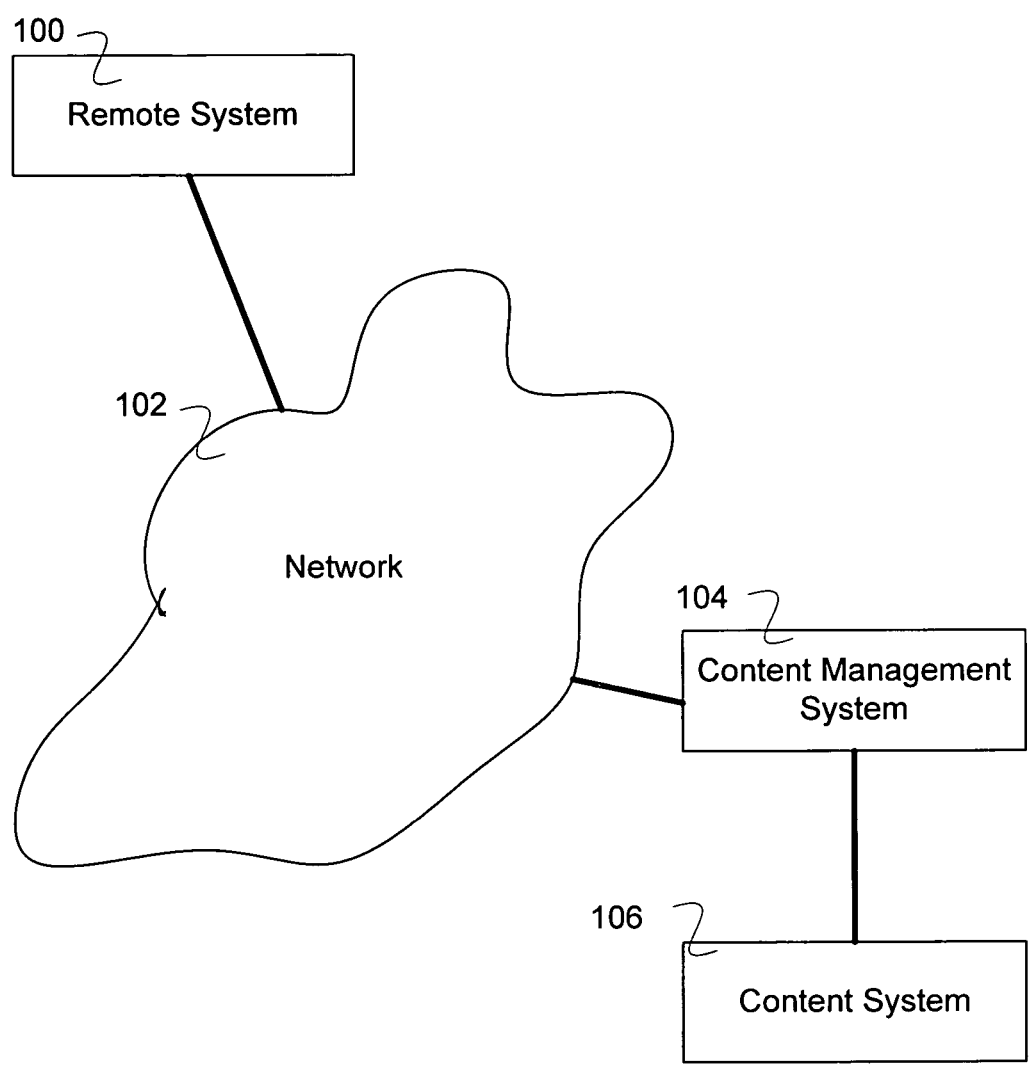
FIG. 1 is a block diagram illustrating a typical prior art system for providing access to managed content.

FIG. 1 is a block diagram illustrating a typical prior art system for providing access to managed content. In the example shown, remote system 100 is connected to network 102. Content management system 104 is connected to network 102 and content system 106. Remote system 100 may be geographically remote from or geographically near to content management system 104. Network 102 may be a local area network, a wide area network, a wireless network, a wired network, the internet, or any other network for connecting systems. Content management system 104 may be connected to content system 106 using a direct connection, a local area network, a wide area network, or any other network for connecting systems. In some embodiments, content management system 104 and content system 106 are both implemented in one physical computer system. In some embodiments, content system 106 is implemented in one or more physical computer systems which each include one or more storage devices. In a typical approach, a user of remote system 100 communicates to content management system 104 via network 102 a request to retrieve content. The request may be for a specific stored object, e.g., a file identified by a unique identifier, or search criteria—e.g., word processing documents authored by a specified person on a specified date—may be provided. If specific content is identified, content management system 104 typically retrieves the content from content system 106 and sends the content to remote system 100 via network 102. In the case of a less specific request, e.g., a query to locate content that satisfies one or more criteria specified in the request, the content management system 104 typically obtains from content system 106 data and/or metadata associated with those stored objects, if any, that satisfy the criteria. Content system 106 typically maintains a database comprising metadata associated with the managed content and uses the metadata to identify stored objects that satisfy the criteria defined by the requesting user. All or a portion of the data or metadata returned by the content system 106 to the content management system 104, or other data derived at least in part from the returned data, is provided by content management system 104 to remote system 100. A user may subsequently use the data provided to request retrieval of a particular stored object.

Figure 2:
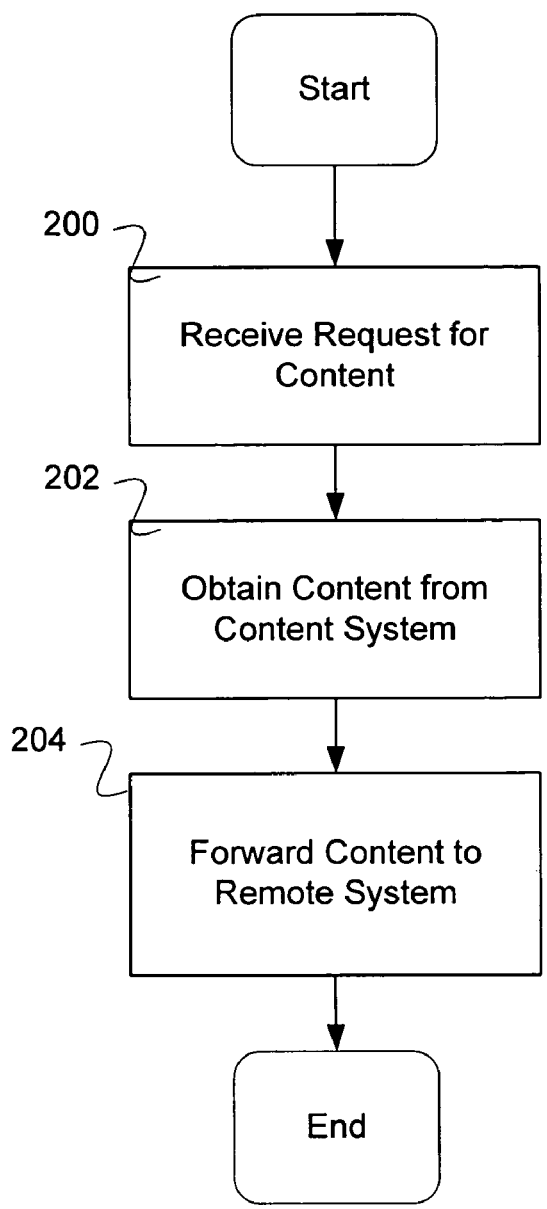
FIG. 2 illustrates an embodiment of a typical prior art process for providing access to managed content.

FIG. 2 illustrates an embodiment of a typical prior art process for providing access to managed content. In the example shown, in 200 a request for content is received at the content management system. In 202, the requested content is obtained by the content management system from the content system. In 204, the requested content is forwarded to the remote system from the content management system. As described above, the two step transfer approach shown in FIG. 2, in which requested content is first sent from the content system to the content management system and then sent by the content management system to the remote host that requested the content, can result in unwanted delay, especially in the case of large files and/or slow data transmission due to geographic remoteness of the remote host, limited transmission path capacity (bandwidth); high traffic, etc.

Figure 3:
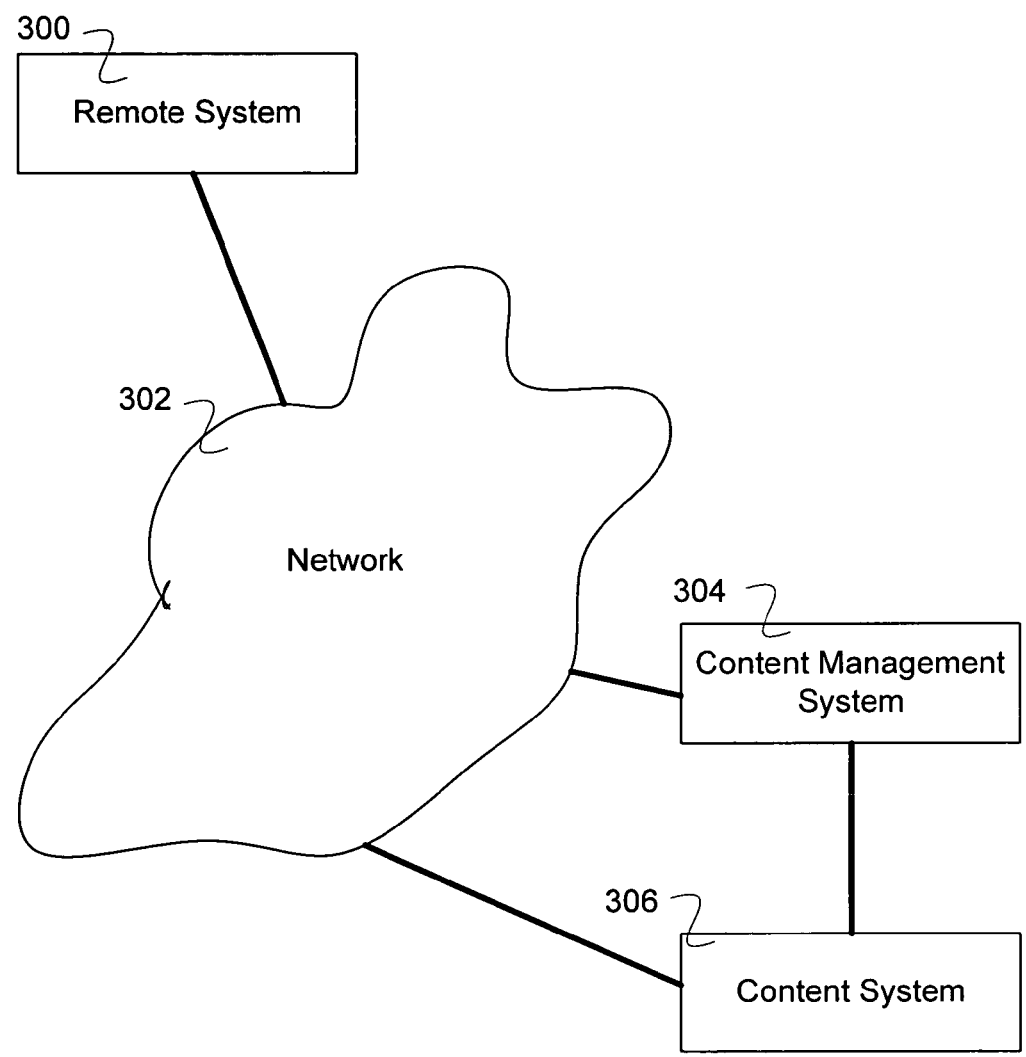
FIG. 3 is a block diagram illustrating an embodiment of a system for providing direct access to managed content.

FIG. 3 is a block diagram illustrating an embodiment of a system for providing direct access to managed content. In the example shown, remote system 300 is connected to network 302. In various embodiments, network 302 includes a local area network, a wide area network, a wireless network, a wired network, the internet, an intranet, and/or any other network for connecting systems. Content management system 304 is connected to network 302 and content system 306. Content system 306 is connected to content management system 304 and network 302. In various embodiments, content management system 304 is connected to content system 306 using a direct connection, a local area network, a wide area network, the internet, an intranet, and/or any other network for connecting systems. In some embodiments, content management system 304 does not have a connection to content system 306 except through network 302, and the content management system 304 and content system 306 exchange data via network 302. In some embodiments, content management system 304 and content system 306 are both implemented in one physical computer system. In various embodiments, remote system 300 is geographically remote from or geographically near to content management system 304. In some embodiments, remote system 300 is one of a plurality of hosts able to access content management system 304 via network 302. In some embodiments, content system 306 is implemented in one or more physical computer systems each of which includes one or more storage devices. In some embodiments, content management system 304 does not act as a middleman by obtaining requested content from content system 306 and forwarding the content on to the remote system 300. Instead, for at least some requests (e.g., for objects larger than a threshold size), the content management system 304 is configured to obtain from the content system 306, and content system 306 is configured to provide, data required by the content management system 304 to form a URL or other identifier, locator, etc. to be provided by the content management system 304 to the remote host 300 to enable the remote host 300 to obtain the requested content directly from the content system 306.

Figure 4A:
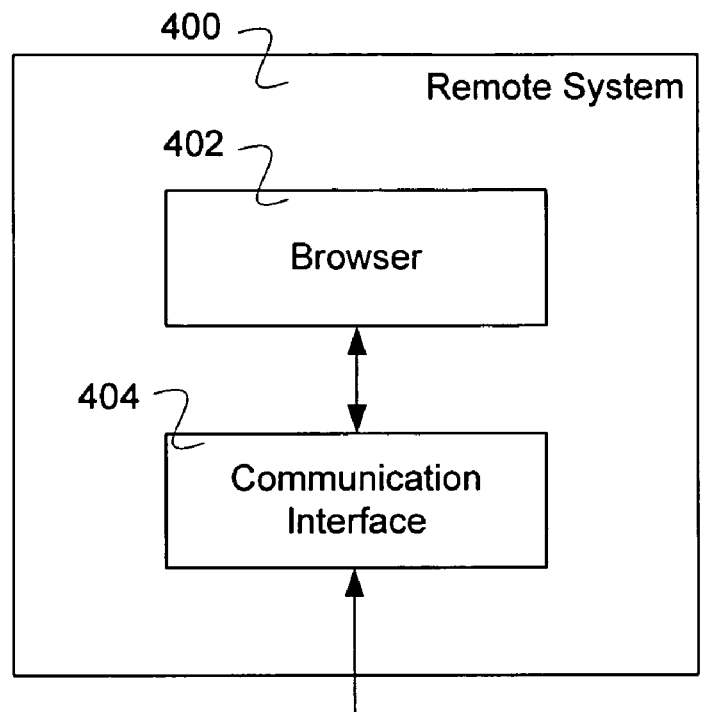
FIG. 4A is a block diagram illustrating an embodiment of a remote system.

FIG. 4A is a block diagram illustrating an embodiment of a remote system. In the example shown, remote system 400 includes browser 402 and communication interface 404. Browser 402 interacts with a user to obtain information for and provide information from the remote system. In some embodiments, browser 402 interacts with the user by displaying information on a monitor and by receiving information from the user from a keyboard and/or a mouse. Communication interface 404 is used to communicate with a connected network, such as network 302 of FIG. 3. In some embodiments, remote system 400 includes storage devices and/or memory, not shown in FIG. 4A, to store information, and one or more processors to process information. In various embodiments, browser 402 comprises an internet browser, Microsoft Internet Explorer™, Mozilla Firefox™, a Microsoft Outlook™ plug-in, or any other application interfacing with the user and allowing navigation of a stored set of content. In some embodiments, browser 402 and communication interface 404 are used to exchange data with a content management system, such as content management system 304 of FIG. 3, which in various embodiments comprises a web or other application server or another system configured to manage stored content. In some embodiments, browser 402 and communication interface 404 are used to send to a content management system a request for content, receive from the content management a response comprising data usable to obtain the request content directly from a content system (e.g., a URL or other locator or identifier), and request and obtain the requested content directly from the content system. In various embodiments, remote system 400 is implemented using one computer system, multiple computer systems, or any other appropriate hardware and software systems.

Figure 4B:
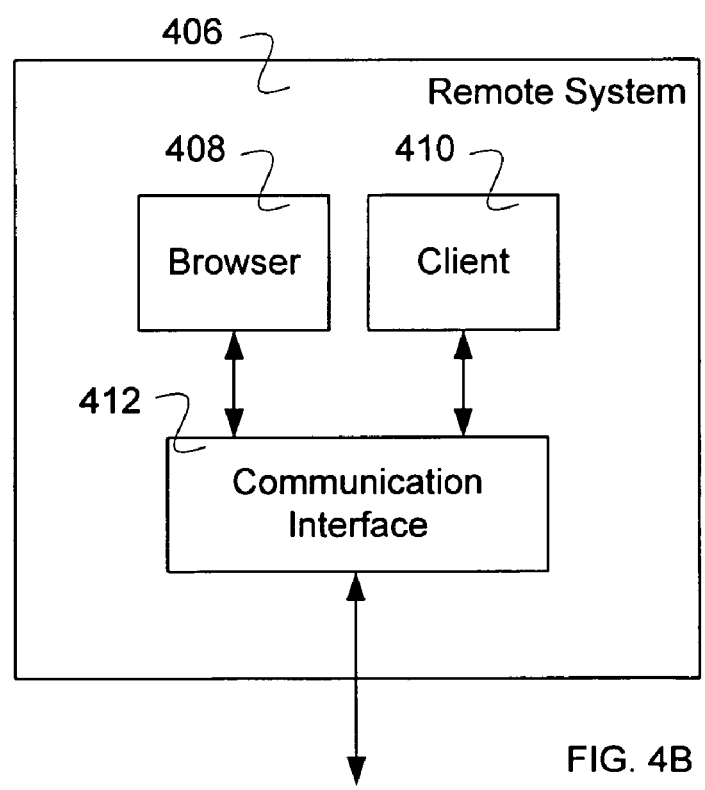
FIG. 4B is a block diagram illustrating an embodiment of a remote system.

FIG. 4B is a block diagram illustrating an embodiment of a remote system. In the example shown, remote system 406 includes browser 408, client 410 and communication interface 412. Browser 408 interacts with a user to obtain information for and provide information from the remote system. In some embodiments, browser 408 interacts with the user by displaying information on a monitor and by receiving information from the user from a keyboard and/or a mouse. Communication interface 412 is used to communicate with a connected network. In some embodiments, remote system 406 includes storage devices and/or memory to store information and one or more processors to process information. In the example shown, client 410 is spawned by browser 408 to handle at least certain aspects of the interaction with the content management system and/or the content system. In some embodiments, client 410 provides functionality beyond the functionality it would be practical and/or possible to provide using browser 408 alone to interact with the content management system and/or content system. In some embodiments, client 410 tracks the status of content transfers and handles interrupted data transfers by resuming where the transfer was interrupted from the same or a different source. In some embodiments, client 410 handles the details of the data transfer by determining and/or tracking the locations on the storage devices where the data is coming from and to. In some embodiments, browser 408 is used to send a request for content to the content management system and the content management system responds by sending to client 410 a URL or other locator usable by the client 410 to obtain the requested content directly from the content system. In some embodiments, client 410 uses the URL or other locator to request and receive the content directly from the content system. In various embodiments, remote system 406 is implemented using one computer system, multiple computer systems, or any other appropriate hardware and software systems.

In some embodiments, remote system 406 spawns client 410 to receive the content locator and obtain the content from the content system using the content locator. Client 410 also handles errors, picks up data transfers from where they left off after an interruption, and retrieves content from a different (e.g., backup, secondary, etc.) content system if the original system is no longer available to transfer content. In addition, client 410 takes care of handshaking between the content management system and remote system 406 as well as the content system and the remote system 406. Client 410 manages the location that data is transferred to and from including the relevant folder locations, the file and/or object names, how to display the folders, and any differences required due to operating system conventions (e.g. different naming protocols, etc.). In some embodiments, client 410 handles a digital signature or other type of security that allows verification of the interaction between remote system 406 and the content management system and between the between remote system 406 and the content system. In various embodiments, client 410 handles compression or decompression and/or encryption or decryption of the transferred content as appropriate. In some embodiments, client 410 reverts to the transfer of content through the content management system in the event that it is not possible (for file structure, access, or any other reason) to transfer content directly to or from the content system.

Figure 5:
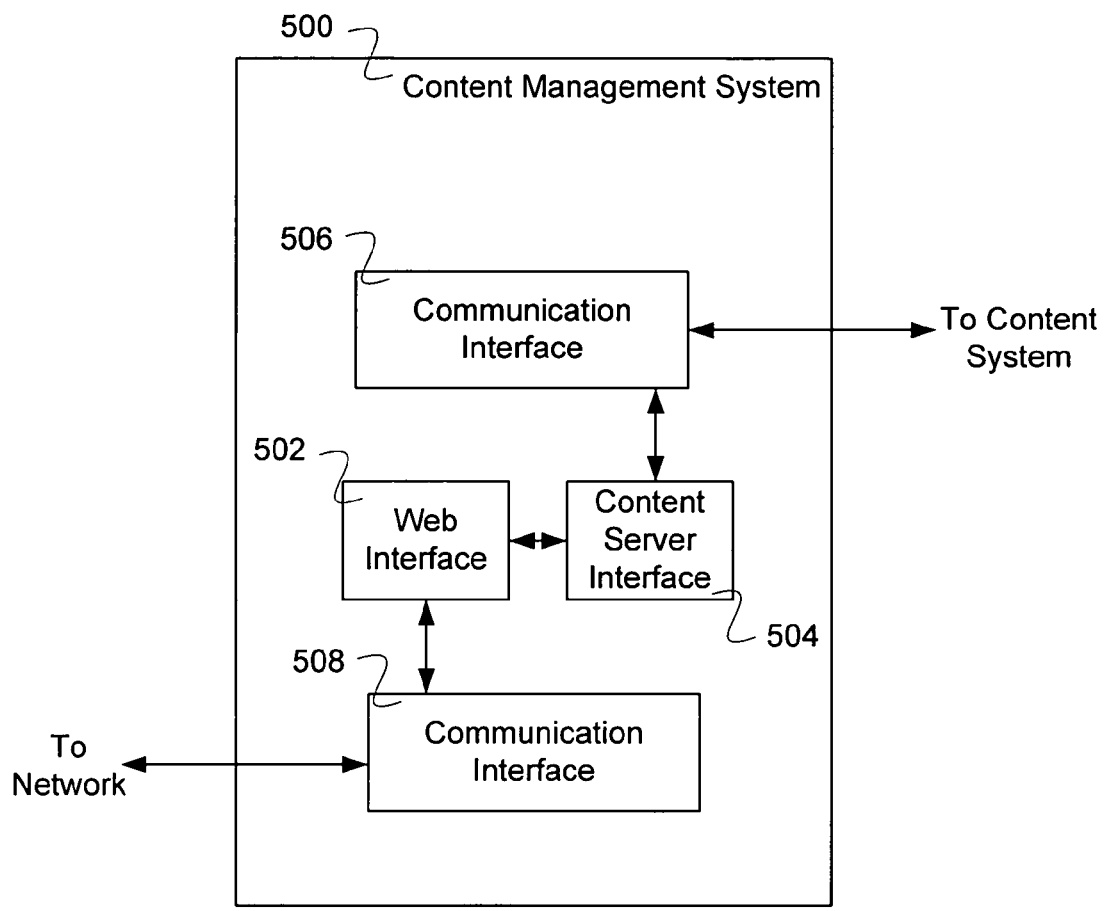
FIG. 5 is a block diagram illustrating an embodiment of a content management system.

FIG. 5 is a block diagram illustrating an embodiment of a content management system. In the example shown, content management system 500 includes communication interface 508, web interface 502, content system interface 504, and communication interface 506. Web interface 502 is connected to communication interface 508. Communication interface 508 comprises a network interface card (MC) or other interface. Web interface 502 interacts with one or more remote systems to handle requests to read data from and/or write data to a content system. Web interface 502 is connected to content system interface 504 to be able to obtain information required to handle content requests and requests to write content. In some embodiments, web interface 502 communicates via the Internet and/or one or more private and/or public networks, using communication interface 508. In some embodiments, web interface 502 includes a set of web tools and/or web development components. In some embodiments, web interface 502 comprises a web application built using a web development tool or kit associated with content server interface 504. In some embodiments, content server interface 504 comprises a framework for managing content for web or other applications running on content management system 500. In some embodiments, content server ° interface 504 comprises classes of content management objects that web interface 502 may be configured to invoke, as required, e.g., in a manner specified in an API (application programming interface) or other specification or definition, to accomplish content management related tasks, such as storing, tracking, finding, retrieving, associating metadata with, and otherwise managing stored content. In some embodiments, content system interface 504 includes an API and/or a library that provides an API to the content server. In some embodiments, web interface 502 and content server interface 504 comprise software code executed by one or more processors associated with content management system 500.

Content system interface 504 is connected to a content server or other content system through communication interface 506. In some embodiments, content system interface 504 communicates with the content server using communication interface 508 and communication interface 506 is omitted. In various embodiments, content management system 500 is implemented using multiple computer systems, one computer system, or any other appropriate hardware and software systems.

Figure 6:
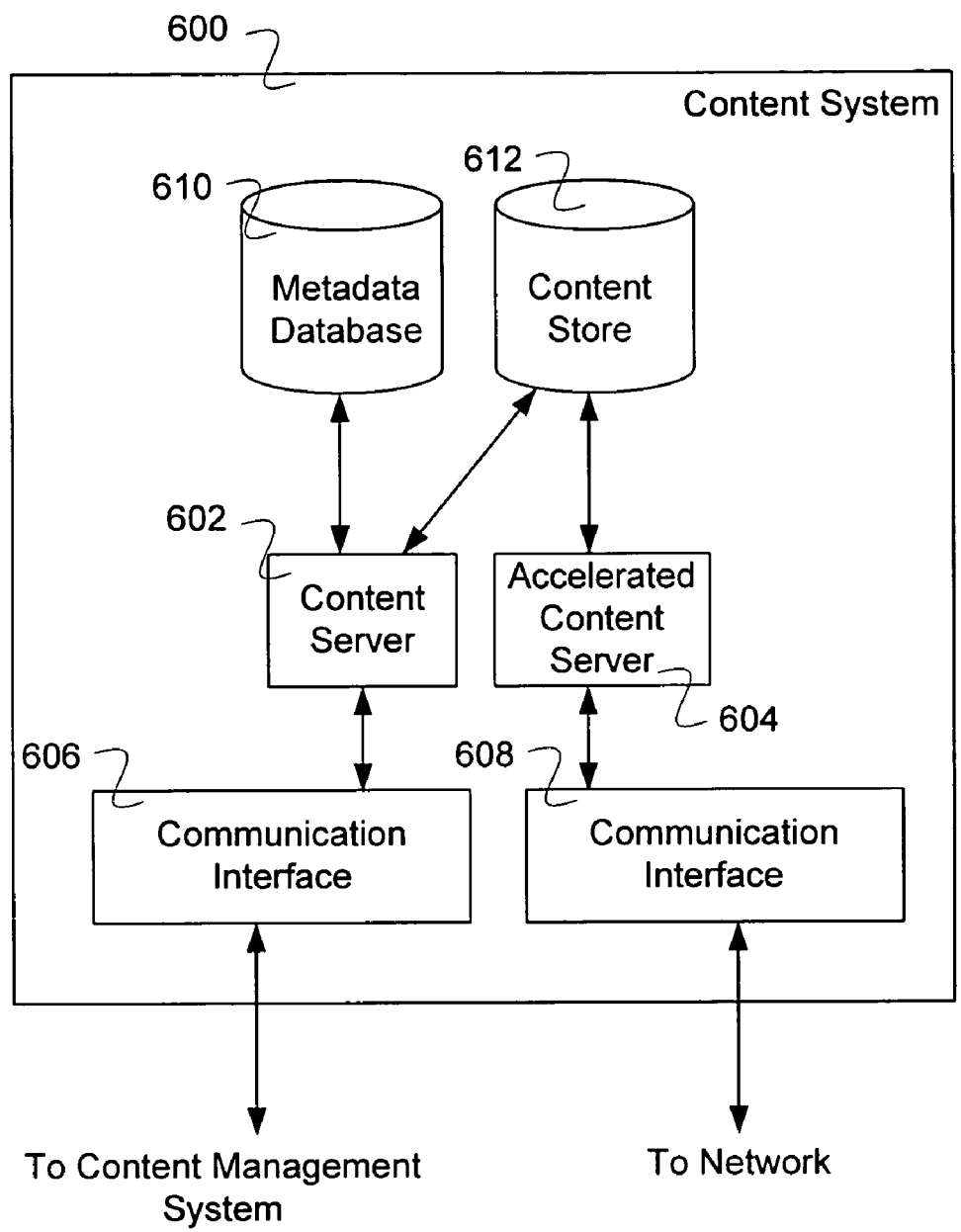
FIG. 6 is a block diagram illustrating an embodiment of a content system.

FIG. 6 is a block diagram illustrating an embodiment of a content system. In the example shown, content system 600 includes content server 602, accelerated content server 604, communication interface 606, communication interface 608, metadata database 610, and content store 612. In some embodiments, content store 612 is used to store one or more sets of managed content managed by a content management system. In some embodiments, a set of managed content includes one or more stored content objects, such as documents, files, or other objects. In some embodiments, content server 602 is queried through communication interface 606 to search for relevant content to respond to a content request. Content server 602 searches for the relevant content by interrogating the metadata database 610 and/or the stored content in content 612. Accelerated content server 604 is accessed directly from a network through communication interface 608 so that files can be directly read from and written to the content store 612. In some embodiments, direct access of content store 612 by a remote system through a network improves performance by avoiding indirect data transfers through a content management system. In various embodiments, content system 600 is implemented using multiple computer systems, one computer system, or any other appropriate hardware and software systems including data storage devices such as magnetic hard drives, tape drives, semiconductor memory devices, optical data storage devices, or any mass or other storage device.

In some embodiments, metadata database 610 contains metadata information about the content in content store 612. Examples of metadata include when and by whom documents were created, modified, edited, reviewed, and approved; keywords related to documents; version data; routing and collaboration data; date/time the content was created, modified, etc.; and data associating two or more stored objects with each other, e.g., to create and manage a "virtual" document or object. In various embodiments, keywords in metadata database 610 are entered by the creator, editor, modifier, or approver of the document or by an automatic process or engine that scans the document to extract or identify relevant keywords, such as by using natural language or other linguistic technologies to identify key concepts based on the words comprising the document.

In some embodiments, content server 602 maintains a file system or other hierarchical organization or view of content in content store 612 and accelerated content server 604 has no file system of its own and instead uses the file system of content server 602 to read/write content from/to content store 612. In some embodiments, accelerated content server 604 comprises a web server.

In some embodiments, content server 602 has information regarding files, documents, or objects that have been transferred out of content store 612, i.e., objects that have been "checked out" for editing or other use by a user, enabling management of requests for content. In some embodiments, a content management system associated with the content server keeps track of which objects have been checked out. In some such embodiments, a subsequent request to the content management system to retrieve an object that has been checked out and has not yet been checked back in is denied, e.g., by sending a reply indicating the content is not currently available, is checked out to a user identified in the reply, etc.

Figure 7:
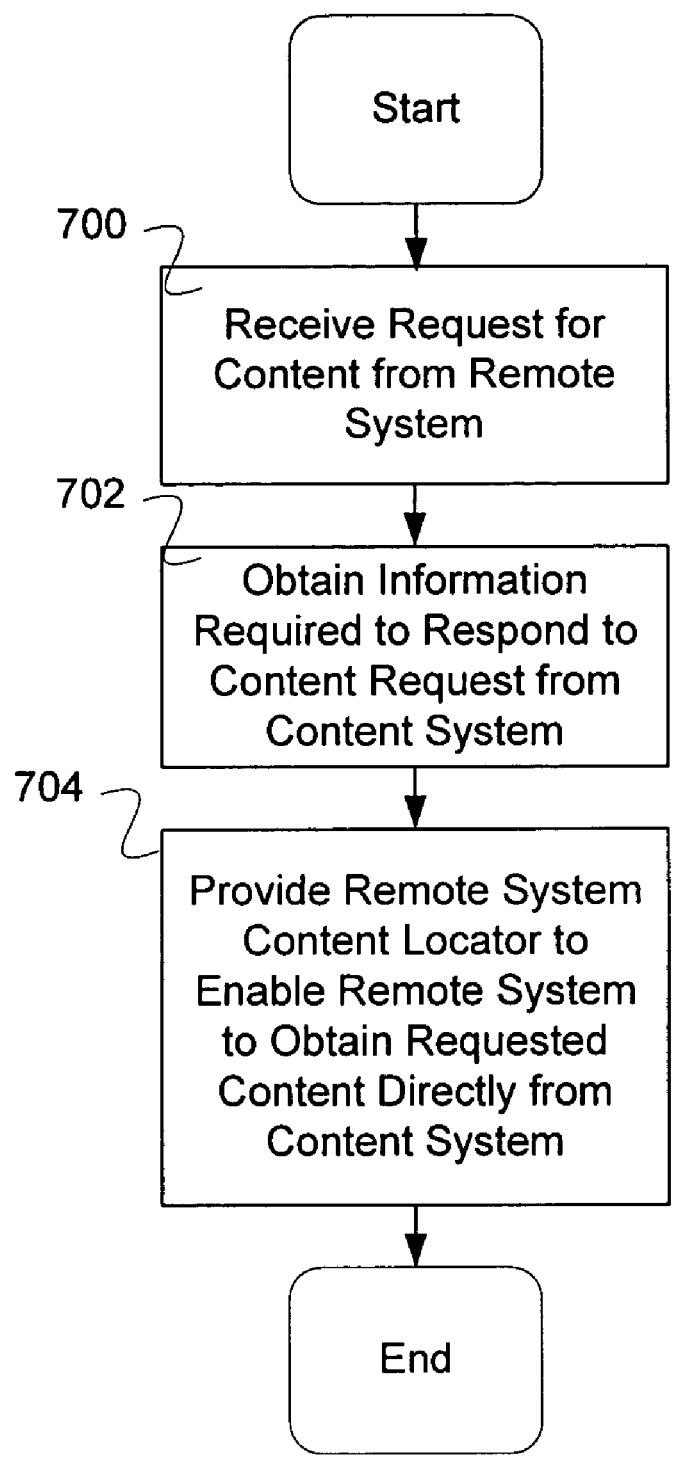
FIG. 7 illustrates an embodiment of a process for providing direct access to managed content.

FIG. 7 illustrates an embodiment of a process for providing direct access to managed content. In some embodiments, the process of FIG. 7 is implemented on a content management system, such as content management system 304 of FIG. 3. In the example shown, in 700 a request for content is received. In some embodiments, the request is received at a content management system from a remote system, e.g., from a browser, client, or other application running on the remote system. In 702, information required to respond to content request is obtained from a content system. In some embodiments, at 702 a content management system that received the request received at 700 sends to the content system a query associated with the requested content and receives response data from the content system. In 704, a content locator based at least in part on the information obtained in 702 is forwarded to the remote system from the content management system. The content locator enables the remote system to obtain the requested content directly from the content server by using the content locator, e.g., a URL, to request the content directly from the content server, without the content first passing through the content management system. In some embodiments, obtaining content directly includes data transfers through multiple intermediate nodes of a data communication network such as the interne, a local area network, a wide area network, or any other network for transferring data, with the transfer originating from the content server and terminating at the remote host without first being sent to the content management system.

Figure 8:
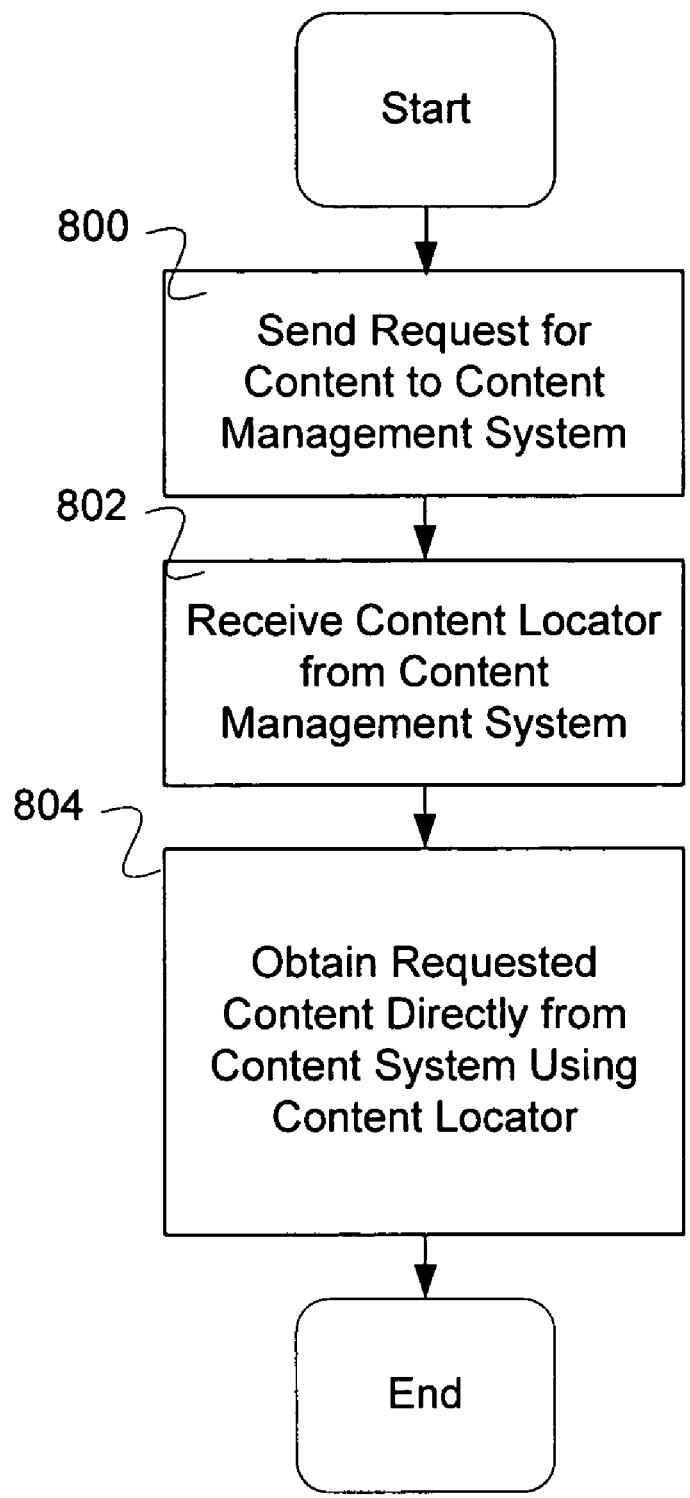
FIG. 8 illustrates an embodiment of a process for accessing managed content directly.

FIG. 8 illustrates an embodiment of a process for accessing managed content directly. In some embodiments, the process of FIG. 8 is implemented on a remote host, such as remote system 300 of FIG. 3. In some embodiments, the process of FIG. 8 is implemented at least in part by a browser, client, and/or other application, or any suitable combination thereof. In the example shown, in 800 a request for content is sent to a content management system. The content request can be a request for a specific file or object stored in the content management system or a request for files or objects that satisfy one or more criteria; for example, files or objects that were created by John Doe, files or objects that were signed by Jane Doe, or files or objects that are related to email messages sent by Thomas Smith on a specific date. In 802, a content locator is received from the content management system. In some embodiments, the content locator is a script that is run by the remote system and includes a URL that enables the remote system to access content through an accelerated content server on a content storage system. In 804, the content locator is used to obtain the requested content directly from the content system, i.e., without the content first passing through the content management system.

Figure 9:
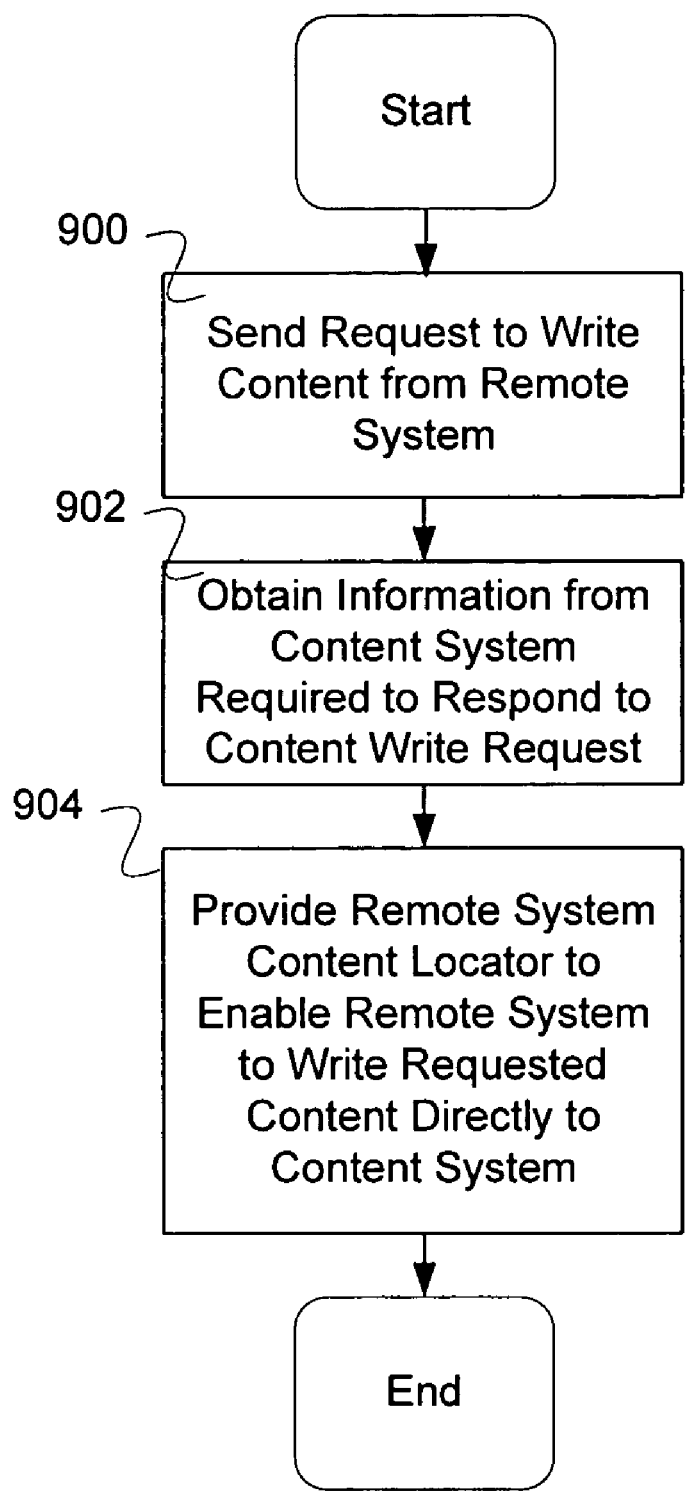
FIG. 9 illustrates an embodiment of a process for providing direct access to managed content.

FIG. 9 illustrates an embodiment of a process for providing direct access to managed content. In some embodiments, the process of FIG. 9 is implemented on a content management system. In the example shown, a request to write content is received in 900. In some embodiments, the request is from a remote system and is received at a content management system. In 902, information required to respond to the request to write content is obtained from an associated content system. In some embodiments, at 902 a content management system that received the request received at 900 sends to a content system associated with the object to be written, the remote system that made the request, and/or an application with which the object is associated, a request for information required to enable the remote system to write the object directly to the content system. In 904, a content locator based at least in part on the information obtained at 902 is forwarded to the remote system. The content locator enables the remote system to write the content directly to the content system, i.e., without the content to be written passing through the content management system. In some embodiments, writing directly to the content system includes data transfers through multiple intermediate nodes of a data communication network such as the interne, a local area network, a wide area network, or any other network for transferring data.

Figure 10:
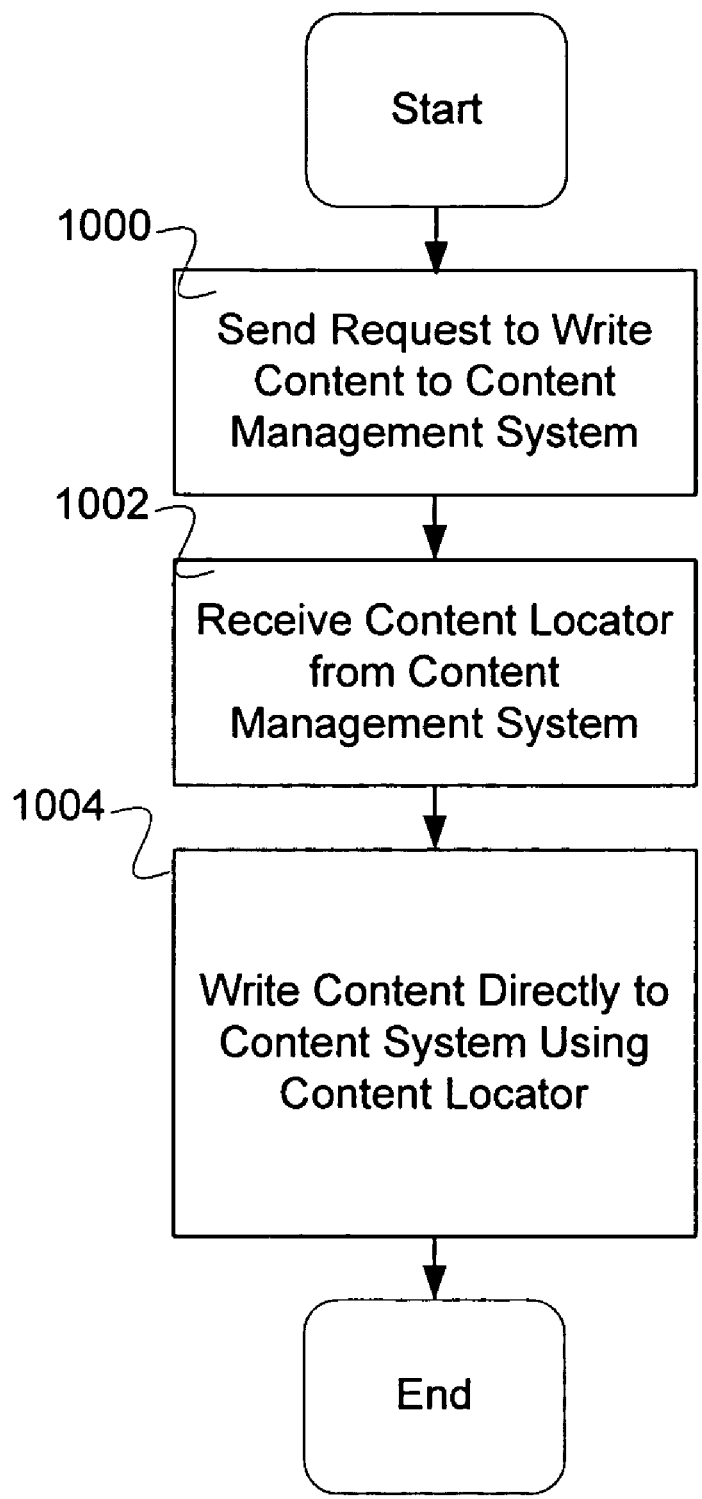
FIG. 10 illustrates an embodiment of a process for accessing managed content directly.

FIG. 10 illustrates an embodiment of a process for accessing managed content directly. In some embodiments, the process of FIG. 10 is implemented on a remote host, such as remote system 300 of FIG. 3. In the example shown, a request to write content is sent to a content management system in 1000. Examples of a request to write content include a request modify a specific file or object stored in a content store associated with the content management system and/or to add or otherwise associate a new object with the content management system and/or content store. In 1002, a content locator is received from the content management system. In some embodiments, the content locator is a script that is run by the remote system and includes a URL that enables the remote system to write content through an accelerated content server on a content storage device. In various embodiments, the content locator is a Java™ script or any other executable or self-executing piece of code or script. In 1004, the content locator is used to write the content directly to the content system, without the content first having to go through the content management system. In some embodiments, the remote system spawns a client to receive the content locator and write the content to the content system using the content locator. The client also handles errors, picks up data transfers from where they left off after an interruption, and handles the situation when the content system that the content is being transferred to is no longer available.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing direct access to managed content comprising:
 receiving a request to perform a write operation with respect to content associated with a set of managed content stored in a content management system;
 obtaining information required to respond to the request to perform the write operation from a content server on the content management system, wherein the content server maintains a file system for the set of managed content; and
 providing in response to the request a content locator usable to perform the write operation through direct communication with an accelerated content server in the content management system without the content to be written passing through the content server on the content management system,
 wherein the accelerated content server has no file system of its own.

2. A method as in claim 1, wherein the information required to respond to the request is determined at least in part by associating with the request one or more data objects comprising the set of managed content.

3. A method as in claim 1, wherein the information required to respond to the request is determined at least in part by associating one or more data objects with the request by querying a metadata database.

4. A method as in claim 1, wherein the request is received from a remote system.

5. A method as in claim 1, wherein the content locator is provided to a remote system from which the request to perform the operation was received.

6. A method as in claim 1, wherein the content locator is based at least in part on at least part of the information required to respond to the request to perform the operation.

7. A method as in claim 1, wherein the content locator includes a URL.

8. A method as in claim 1, wherein the content locator includes executable or self-executing code.

9. A method as in claim 1, further comprising tracking the status of the content associated with the request and managing subsequent requests to perform operations with respect to content based on the status of the content.

10. A method for providing direct access to managed content comprising:
- sending to a content management system a request to perform a write operation with respect to content associated with a set of managed content stored in a content management system;
- receiving from the content management system a content locator usable to perform the write operation, wherein the content locator is determined at least in part by information obtained from a content server on the content management system, wherein the content server maintains a file system for the set of managed content; and
- using the content locator to perform the write operation through direct communication with an accelerated content server in the content management system without the content to be written passing through the content server on the content management system,
- wherein the accelerated content server has no file system of its own.

11. A system for providing direct access to managed content comprising:
- a processor configured to:
- receive a request to perform a write operation with respect to content associated with a set of managed content stored in a content management system;
- obtain information required to respond to the request to perform the write operation from a content server on the content management system, wherein the content server maintains a file system for the set of managed content; and
- provide in response to the request a content locator usable to perform the write operation through direct communication with an accelerated content server in the content management system without the content to be written passing through the content server on the content management system,
- wherein the accelerated content server has no file system of its own;
- and a memory coupled to the processor configured to provide instructions to the processor.

12. A system as in claim 11, wherein the information required to respond to the request is determined at least in part by associating with the request one or more data objects comprising the set of managed content.

13. A system as in claim 11, wherein the content locator is based at least in part on at least part of the information required to respond to the request to perform the operation.

14. A computer program product for providing direct access to managed content, the computer program product being embodied in a computer readable storage medium and comprising computer instructions for:
- receiving a request to perform a write operation with respect to content associated with a set of managed content stored in a content management system;
- obtaining information required to respond to the request to perform the write operation from a content server on the content management system, wherein the content server maintains a file system for the set of managed content; and
- providing in response to the request a content locator usable to perform the write operation through direct communication with an accelerated content server in the content management system without the content to be written passing through the content server on the content management system,
- wherein the accelerated content server has no file system of its own.

15. A computer program product as recited in claim 14, wherein the information required to respond to the request is determined at least in part by associating with the request one or more data objects comprising the set of managed content.

16. A computer program product as recited in claim 14, wherein the content locator is based at least in part on at least part of the information required to respond to the request to perform the operation.

17. A method as recited in claim 1, further comprising verifying the request with a type of security to enable the content locator.

18. A method as in claim 1, wherein the accelerated content server uses the file system of the content server.

19. A method as in claim 10, wherein the content locator includes executable or self-executing code.

20. A method as in claim 10, wherein the content management system tracks the status of the content associated with the request and managing subsequent requests to perform operations with respect to content based on the status of the content.

21. A method as in claim 10, wherein the accelerated content server uses the file system of the content server.

22. A system as in claim 11, wherein the content locator includes executable or self-executing code.

23. A system as in claim 11, wherein the processor is further configured to track the status of the content associated with the request and manage subsequent requests to perform operations with respect to content based on the status of the content.

24. A system as in claim 11, wherein the accelerated content server uses the file system of the content server.

25. A computer program product as in claim 14, wherein the content locator includes executable or self-executing code.

26. A computer program product as in claim 14, further comprising computer instructions for tracking the status of the content associated with the request and managing subsequent requests to perform operations with respect to content based on the status of the content.

27. A computer program product as in claim 14, wherein the accelerated content server uses the file system of the content server.

* * * * *